US008375050B1

(12) United States Patent
LeTourneau

(10) Patent No.: US 8,375,050 B1
(45) Date of Patent: Feb. 12, 2013

(54) DETERMINING FULL SUB-TREE ISOMORPHISM QUERIES OVER NATURAL NUMBER NODE LABELED UNORDERED TREES

(75) Inventor: Jack J. LeTourneau, New York, NY (US)

(73) Assignee: Square Zero, Inc., Woodinville, WA (US)

( * ) Notice: Subject to any disclaimer, the term of this patent is extended or adjusted under 35 U.S.C. 154(b) by 95 days.

(21) Appl. No.: 12/770,653

(22) Filed: Apr. 29, 2010

Related U.S. Application Data

(60) Provisional application No. 61/215,043, filed on Apr. 29, 2009.

(51) Int. Cl.
*G06F 7/00* (2006.01)

(52) U.S. Cl. ......... 707/769; 707/756; 707/797; 707/802

(58) Field of Classification Search ............... 707/999.1, 707/999.101, 756, 769, 797, 802
See application file for complete search history.

(56) References Cited

U.S. PATENT DOCUMENTS

| | | | | |
|---|---|---|---|---|
| 5,787,432 | A * | 7/1998 | LeTourneau | 707/741 |
| 6,055,537 | A * | 4/2000 | LeTourneau | 707/999.1 |
| 2005/0267908 | A1 * | 12/2005 | LeTourneau | 707/101 |
| 2006/0004817 | A1 * | 1/2006 | Andrews | 707/101 |
| 2006/0095455 | A1 * | 5/2006 | LeTourneau | 707/101 |
| 2006/0129582 | A1 * | 6/2006 | Schiffmann et al. | 707/101 |
| 2006/0271573 | A1 * | 11/2006 | LeTourneau | 707/100 |

* cited by examiner

*Primary Examiner* — Shew-Fen Lin
*Assistant Examiner* — Jieying Tang
(74) *Attorney, Agent, or Firm* — Carr & Ferrell LLP

(57) ABSTRACT

Embodiments of the present invention ease the processing and exchange of information and data between programmatic schema and memory stores. A common and universal indexing system or coordination language is created based on natural number node-labeled tree data structures and use of the full sub-tree isomorphism query as the only operation.

12 Claims, 2 Drawing Sheets f

| | |
|---|---|
| c | c |
| S(c) | c#c |
| c#c | (c#c)#c |
| S(c)#c | ((c#c)#c)#c |
| S(S(c)) | c#(c#c) |
| (c#c)#c | (((c#c)#c)#c)#c |
| S(c#c) | c#((c#c)#c) |
| (S(c)#c)#c | ((((c#c)#c)#c)#c)#c |

f – operation
c – individual parameter
S – monadic operation parameter
– binary operation parameter f – transform operation
c – individual parameter
S – monadic operation
- binary operation

DETERMINING FULL SUB-TREE ISOMORPHISM QUERIES OVER NATURAL NUMBER NODE LABELED UNORDERED TREES

CROSS-REFERENCE TO RELATED APPLICATIONS

The present application claims the priority benefit of U.S. provisional application No. 61/215,043 filed Apr. 29, 2009 and entitled "Determining Full Sub Tree Isomorphism for Natural Number Node Labeled Unordered Trees," the disclosure of which is incorporated by reference.

The present application is related to U.S. patent application Ser. No. 12/015,959 filed Jan. 17, 2008, now U.S. Pat. No. 7,720,807 and entitled "Representing Finite Node-Labeled Trees Using a One Bit Encoding," the disclosure of which is incorporated herein by reference.

BACKGROUND OF THE INVENTION

1. Field of the Invention

The present invention generally relates to information technology. More specifically, the present invention relates to querying, processing, and exchanging information about finite natural number node labeled rooted unordered trees and the associated full or bottom up sub-tree isomorphism query for those trees.

2. Description of the Related Art

Computers have made dramatic advances in their ability to store, process, and communicate information. This rapid advancement in computer science is, in large part, a credit to breakthroughs in chip design, software programming, and networking technologies. Notwithstanding these advances, there is a continued—and increasing—need for the storage of more data in less space and the processing of more information in less time and with increased accuracy. The ability to process information within a computer system, including the storage and transmission of that information is largely governed by two factors: processor speed and the number of logical or computational steps required for the processing of that information or any particular segment thereof. While clock speeds of processors continue to increase the number of processing steps required to accomplish certain natural tasks is logically determined and often with stringent limitations.

Computer programming involves manipulating data structures and their component data using algorithmic instructions written in languages utilizing precise and pre-defined processing rules. Certain processes are fundamental yet inherently complex. With respect to these processes no amount of ingenuity can reduce the associated complexity or number of steps beyond a certain threshold.

It is well recognized that tree structures, in general, and finite natural number node labeled, unordered trees, in particular, are especially critical data structure within all parts of modern middle-ware technology. The natural combined tree operation of asking if one such tree is isomorphic to some full sub-tree of a second tree is an essential and necessary logical operation on trees. There is, therefore, a need in the art for determining for any two finite node labeled trees, if one is isomorphic to some full sub-tree of another node labeled tree.

SUMMARY OF THE INVENTION

Embodiments of the presently claimed invention provide for ease of processing and exchange of information and data between different hierarchical schema and memory stores. Such embodiments provide for a common indexing system or hierarchical coordination language based on the finite natural number node-labeled unordered tree data structure and the associated full sub-tree isomorphism query. The presently claimed invention offers a common programming element for use at the base or foundation level of all container-oriented manipulation.

To ensure compatibility with the rest of the binary world, embodiments of this index or coordination structure are defined using just two symbols. The new language elements of this invention provide a mechanical translation from a simple logical language that describes node labeled trees in an algebraic fashion into the class of all unlabeled finite trees. The natural number node labeled tree are thus described or named using a true one bit encoding. This coordination structure is, in itself, algebraic in nature thereby allowing for the combining of object or node labeled tree names that the coordination scheme may create using its own internal methods.

A first claimed embodiment, for example, involves a method for translating a node labeled tree into a tree. Through this method, node labeled trees x and y are received as an input query at a computing device having a processor and memory. An individual, monadic operation, or binary operation parameter for the describing the node labeled trees is established. The node labeled trees are then transformed into binary strings f(x) and f(y) using an operation f, wherein f utilizes natural syntactic recursion and one or more rules. Results of the query are stored as a term in memory.

A computer-readable storage medium is likewise claimed. Instructions capable of execution by a processing device are embodied upon the storage medium. Execution of the instructions performs a method for translating a node labeled tree like that discussed above.

Embodiments of the present invention may also be arithmetically universal in that both addition and multiplication are elementarily definable within the system. These and other embodiments may also support the manipulation of certain fragments of monadic or weak monadic second-order logic.

DETAILED DESCRIPTION

Figure 1:
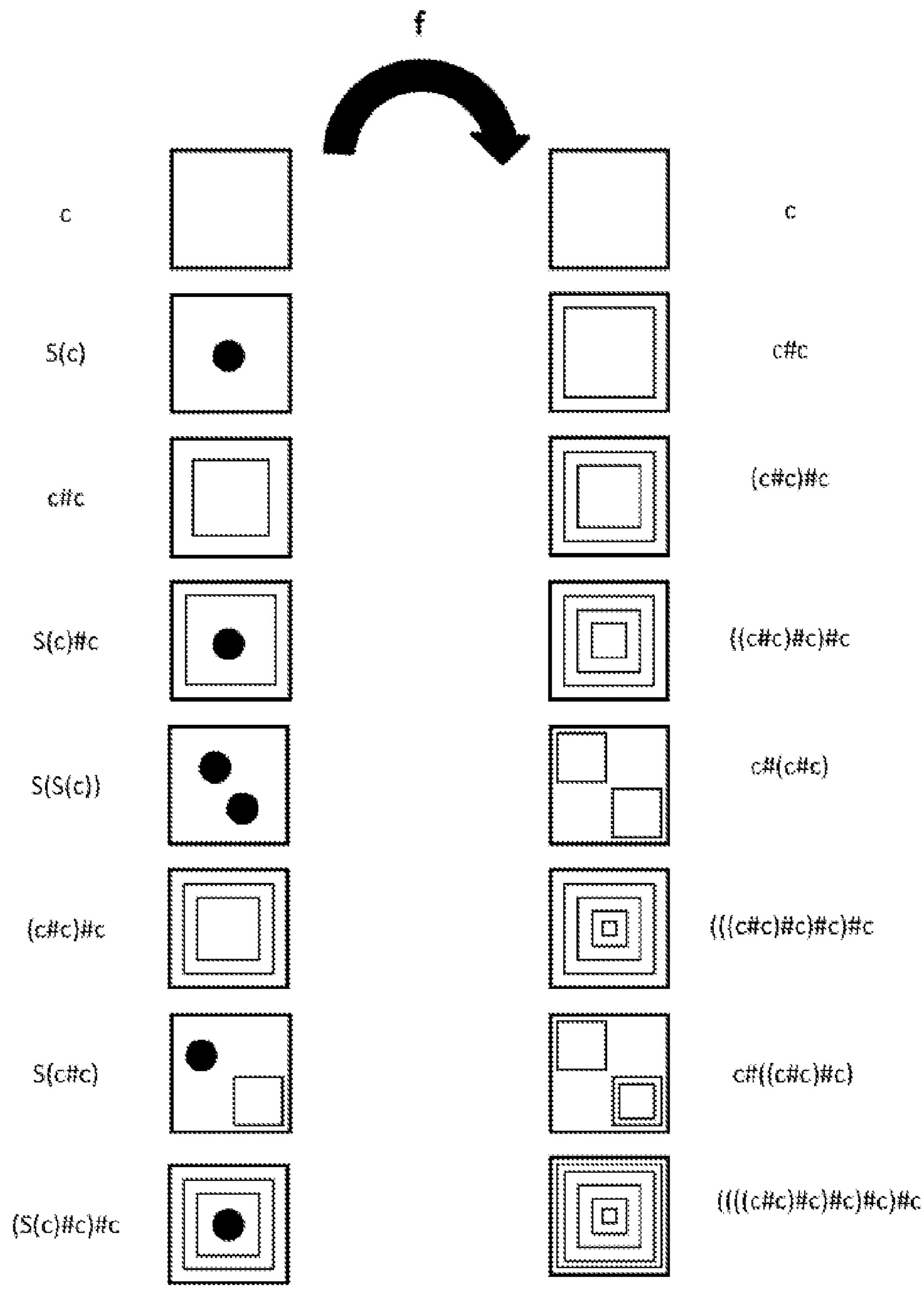
FIG. 1 illustrates a portion of the translation between the three symbol node labeled tree algebraic terms and the two symbol unlabeled tree algebraic terms.

The presently disclosed invention allows for the determination of a question that asks if a particular finite natural number node labeled rooted unordered tree is isomorphic to a full or bottom up sub-tree of a second like tree. The disclosed invention operates in two phases. The first such phase is referred to as the Preparation Phase. The second phase is referred to, herein, as the Query Decision Phase.

The present disclosed invention also adopts a standard syntax-oriented algebraic technique for representing or naming finite natural number node-labeled rooted unordered tree isomorphism types. Said syntax uses a three symbol alphabet composed of an individual parameter symbol—"c"; a monadic operation parameter symbol—"S"; and a binary operation parameter symbol—"#."

Embodiments of the presently disclosed invention may operate in the context of a computing environment. For example, instructions encompassing one or more aspects of the presently disclosed invention may be stored in a computer-readable storage medium. These instructions may be executed by the processor of a computing device to implement the methodologies or processes described herein. In some embodiments, the processor may be an application specific integrated circuit (ASIC) encoded with microcode rather than a general purpose computing device.

The aforementioned instructions may be accessed in a localized computing device, over a local area network (LAN) such as a corporate LAN, or a wide area network (WAN) such as the Internet using cloud computing techniques. The aforementioned operations may likewise be implemented in the context of larger applications, services, or apparatus. Results may be displayed, stored, transmitted, or utilized in the context of a further application. Such a computing device may include one or more network interfaces for the receipt, transmission, or exchange of data over said networks.

The following two line logic program asserts or creates, as its core or Herbrand model, an isomorphic copy of an algebraic structure. This structure is based on a universe of finite natural numbers node labeled rooted unordered trees while asserting exactly three operations on the node labeled trees. The first such operation is that of naming a tree root storing zero while using the individual parameter symbol "c." The second operation is a naming operation that adds 1 to the numeric value stored in the root node or any tree using the monadic operation parameter symbol "S." The third and final operation is that of naming the tree attachment operation using the binary operation parameter symbol "#."

*S(x#y)=x#S(y);*

*x#(y#z)=y#(x#z)*

Transforming the input trees for any sub isomorphism query into an internal three symbol term notation is the initial task of the Preparation Phase of the aforementioned logic.

Each finite rooted unordered node labeled-tree is naturally described or named by a prefix term in the three letter alphabet {c, S, #}. This natural description or naming takes place with the equality symbol between terms being interpreted to mean that the two terms in question are inter-translatable using only the equation of counting and the equation of compounding. An example of the equation of counting is disclosed in the context of S(x#y)=x#S(y) while an example of the equation of compounding is found in the context of x#(y#z)=y#(x# z). It is natural to associate various forms of symbol count for each node labeled tree, a count that depends on the values of the symbols used to describe the node labeled tree being named.

The aforementioned symbol count associates each use of the monadic operation symbol "S," a count of 1, and with each use of the binary operation symbol "#," a count of 2. The single letter term "c" has a symbol count of 0 and all other {c, S, #}-prefix terms have a symbol count equal to the sum of the count of their individual symbols. The idea of a finite node labeled tree symbol count is the two dimensional analog of the one dimensional notion of a finite strings length.

The symbolic count can be used as pre-condition for determining sub-tree isomorphism. A node labeled tree "x" is isomorphic to some full sub-trees of a second node labeled tree, "y," but only if the symbol count of "x" is smaller than the symbol count of "y." The use of such a filter reduces processing required for the second phase of the stated algorithm and can be extended in multiple directions using different pattern matching schemes that depend upon the notion of a symbolic count.

In the Query Decision Phase, for any input node labeled trees "x" and "y," ƒ is the operation described below and that transforms each of the node labeled input trees involved in a sub-tree query into certain binary strings named f(x) and f(y), respectively. This operation ƒ uses the natural syntactic recursion inherent in the definition of the three letter terms used to describe the finite natural number node labeled trees.

A node labeled tree term is the individual parameter "c," a term that is constructed using either the monadic operation parameter "S," or the binary operation parameter "#." In the Query Decision Phase, special terms referred to as "towers" use the aforementioned distinction.

The four general rules off used for translating the node labeled trees into tree are:

| | | | | |
|---|---|---|---|---|
| f(c) | → | c | | c; |
| f(S(x)) | → | c#f(x) | | #cf(x); |
| f(x#y) | → | f(x)#f(y), | x not a tower | #f(x)f(y); |
| f(x#y) | → | (f(x)#c)#f(y), | x a tower | ##f(x)cf(y), |

where a term is a tower term if and only if the term is a fully left-associated term that looks like c, c#c, (c#c)#c, ((c#c)#c)#c, (((c#c)#c)#c#c), etc. or it is a fully left-associated term that look like cˆ, cˆ#c, (cˆ#c)#c, ((cˆ#c)#c)#c, (((cˆ#c)#c)#c#c), etc.

FIG. 1 illustrates a portion of the translation between the three symbol node labeled tree algebraic terms and the two symbol unlabeled tree algebraic terms. A direct consequence of the defined translation ƒ is the fact that for any two finite unordered node labeled trees, the first is a full sub-tree of the second if—and only if—the ƒ transformation of the first tree is a sub-tree of the ƒ transformation of the second tree.

Node labeled sub-tree isomorphism queries may be translated into logically equivalent unlabeled sub-tree isomorphism queries for which there are known sub-linear solutions. An example of such a translation appears in the 2006 "Intelligent Engineering Systems Proceeding Conference," the disclosure of which is incorporated herein by reference.

Figure 2:
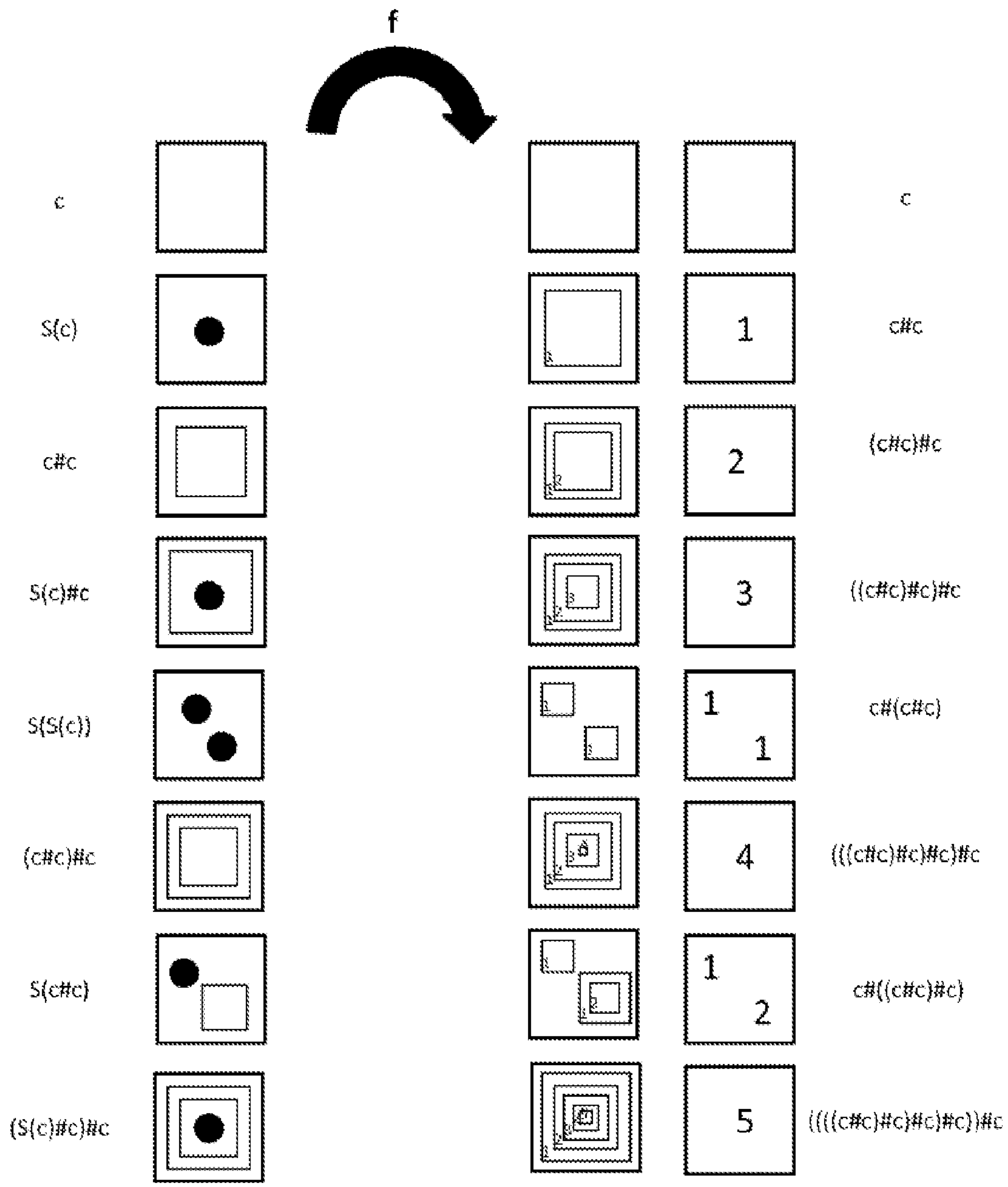
FIG. 2 illustrates the initial natural number labeled trees and the f-images of the same trees with their towers replaces with finite multi-sets of natural number labels.

The presently disclosed processes may be iterated or repeated with beneficial results. For example, once the initial input trees have passed all initial screenings in a Preparation Phase and have been translated by a function ƒ, each tower in the resulting trees may be replaced with the natural number label that represents the height of the tower being replaced. New node labeled trees may be obtained and subsequently used as input. Cycling through the two phases is efficient and the answer to the original sub-tree isomorphism query is otherwise the same as the initial process. FIG. 2 illustrates the initial natural number labeled trees and the f-images of the same trees with their towers replaced with finite multi-sets of natural number labels.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, other magnetic storage media, a CD-ROM disk, digital video disk (DVD), and any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for determining isomorphism over natural number node labeled unordered trees, the method comprising:

receiving node labeled unordered trees x and y, the node labeled tree received as an input query at a computing device having a processor and a memory;

responsive to the input query:

executing instructions stored in the memory of the computing device via the processor to establish an individual parameter c, a monadic operation S, and a binary operation #, wherein c, S, and # to describe the node labeled unordered trees x and y;

executing instructions stored in the memory of the computing device via the processor to transform the node labeled unordered trees into binary strings f(x) and f(y) using an operation f, wherein the operation f utilizes natural syntactic recursion and the following rules:

| | | | | |
|---|---|---|---|---|
| f(c) | → | c | | c; |
| f(S(x)) | → | c#f(x) | | #cf(x); |
| f(x#y) | → | f(x)#f(y), | x not a tower | #f(x)f(y); |
| f(x#y) | → | (f(x)#c)#f(y), | x a tower | #f(x)cf(y); |

wherein → is a transformation performed by the operation f and the tower is a fully left-associated term; and storing results of the input query as a term in the memory.

2. The method of claim 1, wherein the term is a fully left-associated term.

3. The method of claim 2, wherein the fully left-associated term is referred to as a tower.

4. The method of claim 1, wherein the translation involves two finite unordered node labeled trees and the first tree is a full sub tree of the second.

5. The method of claim 4, wherein the operation f on the first tree results in a sub tree of the operation f on the second tree.

6. The method of claim 1, wherein the node labeled sub trees are translated into logically equivalent unlabeled subtrees having known sub-linear solutions.

7. The method of claim 1, wherein the input query is iterated.

8. The method of claim 1, wherein the input query is repeated.

9. The method of claim 1, wherein each tower in a resulting tree is replaced with a natural number label following a translation by operation f.

10. The method of claim 9, wherein the natural number label represents the height of the tower being replaced.

11. The method of claim 1, wherein new node labeled unordered trees are used as a subsequent input query.

12. A non-transitory computer-readable storage medium having embodied thereon a program, the program being executable by a processor to perform a method for determining isomorphism over natural number node labeled unordered trees, the method comprising:

receiving node labeled unordered trees x and y, the node labeled tree received as an input query at a computing device having a processor and a memory;

responsive to the input query:

executing instructions stored in the memory of the computing device via the processor to establish an individual parameter c, a monadic operation S, and a binary operation #, wherein c, S, and # for the describing to describe the node labeled unordered trees x and y;

executing instructions stored in the memory of the computing device via the processor to transform the node labeled unordered trees into binary strings f(x) and f(y) using an operation f, wherein the operation f utilizes natural syntactic recursion and the following rules:

| | | | | |
|---|---|---|---|---|
| f(c) | → | c | | c; |
| f(S(x)) | → | c#f(x) | | #cf(x); |
| f(x#y) | → | f(x)#f(y), | x not a tower | #f(x)f(y); |
| f(x#y) | → | (f(x)#c)#f(y), | x a tower | #f(x)cf(y); |

wherein → is a transformation performed by the operation f and the tower is fully left-associated term; and storing results of the input query as a term in the memory.

* * * * *